United States Patent [19]
Boucher et al.

[11] Patent Number: 5,934,973
[45] Date of Patent: Aug. 10, 1999

[54] SEMICONDUCTOR WAFER DICING SAW

[76] Inventors: John N. Boucher, 110 Coveridge La., Longwood, Fla. 32779; David E. Bajune, 6800 West S.R. 46, Sanford, Fla. 32773

[21] Appl. No.: 09/022,619

[22] Filed: Feb. 12, 1998

Related U.S. Application Data

[62] Division of application No. 08/546,216, Oct. 20, 1995, Pat. No. 5,718,615.

[51] Int. Cl.$^6$ .............................. B24B 49/00; B24B 51/00
[52] U.S. Cl. ........................ 451/5; 451/8; 451/9; 451/25
[58] Field of Search .................................... 451/5, 8, 9, 6, 451/21, 25, 41; 83/62, 62.1, 58; 125/13.01, 12; 73/7, 104; 364/474.06; 340/680

[56]         References Cited

U.S. PATENT DOCUMENTS

| | | |
|---|---|---|
| 2,578,869 | 12/1951 | Washburn . |
| 2,583,791 | 1/1952 | Neff . |
| 3,626,921 | 12/1971 | Lane . |
| 3,645,002 | 2/1972 | Hefti . |
| 3,763,698 | 10/1973 | Suzuki et al. . |
| 3,803,906 | 4/1974 | Ross . |
| 3,987,670 | 10/1976 | Tuzzeo et al. . |
| 4,180,048 | 12/1979 | Regan . |
| 4,219,004 | 8/1980 | Runyon . |
| 4,787,362 | 11/1988 | Boucher et al. . |
| 5,718,615 | 2/1998 | Boucher et al. ............................ 451/5 |

*Primary Examiner*—David A. Scherbel
*Assistant Examiner*—Derrie Holt Banks
*Attorney, Agent, or Firm*—Allen, Dyer, Doppelt, Milbrath & Gilchrist, P.A. Attorneys at Law

[57]          ABSTRACT

A semiconductor wafer dicing saw is controlled by monitoring blade exposure from a flange holding the blade during the wafer dicing process. As the wafer is cut and separated into discrete electronic chips, the dicing blade wears. As the blade is brought closer and closer toward the wafer during cutting, the blade exposure is continuously being reduced. The small dimensions, coolant flow, and close tolerances typical in the wafer dicing process, do not permit visual inspection. Excess blade wear and thus reduced exposure or flange clearance between the blade cutting edge and flange edge will cause damage to the wafer and blade by restricting coolant flow or by contact of the flange with the wafer. A system is provided for automatically measuring the flange clearance using a height sensor to determine blade wear and a processor for monitoring blade movement toward the wafer during the wafer dicing and stopping the movement when the blade cutting edge reaches a minimum separation distance from the work surface or a minimum blade exposure is reached. A blade history is stored that provide a number of cuts make through the wafer for a given wear.

11 Claims, 3 Drawing Sheets

SEMICONDUCTOR WAFER DICING SAW

CROSS REFERENCE TO RELATED APPLICATION

This application is a divisional of application Ser. No. 08/546,216 filed Oct. 20, 1995 and issuing as U.S. Pat. No. 5,718,615, commonly owned with the present application.

BACKGROUND OF INVENTION

1. Field of Invention

The invention relates generally to the dicing of semiconductor wafers and, more particularly to the monitoring of blade flange clearance for safely cutting the wafer into discrete chips.

2. Background Art

Die separation, or dicing, by sawing is the process of cutting a microelectronic substrate into its individual circuit die with a rotating circular abrasive saw blade. This process has proven to be the most efficient and economical method in use today. It provides versatility in selection of depth and width (kerf) of cut, as well as selection of surface finish, and can be used to saw either partially or completely through a wafer or substrate.

Wafer dicing technology has progressed rapidly, and dicing is now a mandatory procedure in most front-end semiconductor packaging operations. It is used extensively for separation of die on silicon integrated circuit wafers.

Increasing use of microelectronic technology in microwave and hybrid circuits, memories, computers, defense and medical electronics has created an array of new and difficult problems for the industry. More expensive and exotic materials, such as sapphire, garnet, alumina, ceramic, glass, quartz, ferrite, and other hard, brittle substrates, are being used. They are often combined to produce multiple layers of dissimilar materials, thus adding further to the dicing problems. The high cost of these substrates, together with the value of the circuits fabricated on them, makes it difficult to accept anything less than high yield at the die-separation phase.

Dicing semiconductor wafers by sawing is an abrasive machining process similar to grinding and cutoff operations that have been in use for decades. However, the size of the dicing blades used for die separation makes the process unique. Typically, the blade thickness ranges from 0.6 mils to 500 mils, and diamond particles (the hardest known material) are used as the abrasive material ingredient. Because of the diamond dicing blade's extreme fineness, compliance with a strict set of parameters is imperative, and even the slightest deviation from the norm could result in complete failure.

The diamond blade is a cutting tool in which each exposed diamond particle comprises a small cutting edge. Three basic types of dicing blades are available commercially:

Sintered Diamond Blade, in which diamond particles are fused into a soft metal such as brass or copper, or incorporated by means of a powdered metallurgical process.

Plated Diamond Blade, in which diamond particles are held in a nickel bond produced by an electroplating process.

Resinoid Diamond Blade, in which diamond particles are held in a resin bond to create a homogeneous matrix.

Silicon wafer dicing is dominated by the plated diamond blade, which has proved most successful for this application.

Because most state-of-the-art dicing equipment has been designed specifically to dice silicon wafers, problems arise when it is necessary to cut harder and/or more brittle materials. Blade speed and torque, depth of cut, feed rate, and other performance parameters have been optimized for silicon. However, hard and brittle materials require different blades and equipment operating parameters, the proper selection of which is the key to success for high-yield dicing.

In any cutting operation, tool sharpness is of primary importance. More exactly, it is necessary that the cutting tool maintain its sharpness throughout the cutting operation. When cutting hard material such as sapphire or garnet, the cutting edges become dull quite rapidly. Because the dulled cutting edges cannot be resharpened in the usual manner, it is desirable that they be pulled loose from the blade, or else be fractured to expose new sharp cutting edges.

An important characteristic of the resinoid diamond blade, that promotes effective cutting, is its self-sharpening ability. The blade requires no dressing at all, in contrast to most metal-bonded (sintered or electroplated) diamond blades. Sharpening is accomplished automatically by the cutting process. As a cutting edge becomes dull, it experiences increased cutting forces that eventually either pull the diamond particle loose from the blade or else fracture it to produce a new sharp cutting edge. A diamond blade that does not exhibit this property cannot properly cut hard materials, nor can it perform properly if saw operating parameters interfere with the self-sharpening mechanism.

U.S. Pat. No. 4,219,004 addresses a problem in the art of getting the blade cutting surface perpendicular to the substrate being cut and discloses blade mounting means comprising a pair of generally flat round collars, flanges, having a round central opening for receipt by the saw spindle. Further, the outer diameters of the collars are less than the blade diameter for providing an exposure of approximately 15 mils. A blade exposure not greater than 20 to 25 times the blade thickness is recommended. Replacing the collars with those having smaller diameter are disclosed for providing desired exposure and for replacing collars as the blade wears and exposure is reduced. Methods for monitoring or measuring the exposure during the dicing of the substrate is not addressed.

U.S. Pat. No. 4,787,362 discloses an abrasive cutting blade having very high rigidity useful in dicing silicon wafers and hard materials. The use of the flange or spacer for maintaining blade rigidity and providing blade exposure sufficient for completely penetrating the work piece and cutting partially into the intermediate carrier typically used is disclosed. Wobble or run-out is of concern and is inversely proportional to the blade exposure. As a result, blade exposure is held to tight and typically minimal dimensions. The patent discloses the use of a rigid blade core to prevent run-out from causing the core to make contact with the workpiece and causing widening of the cut and a less than even cut. Making the flange larger for providing less exposure is not addressed. However, less exposure means greater chance for inadequate cooling and greater chance of the flange hitting the work piece. The present invention addresses these problems.

U.S. Pat. No. 3,987,670 discloses a displacement transducer manually applied to a diamond blade cutting surface for measuring a distance from the blade cutting edge to a fixed reference distance on the blade. The transducer is mounted on a portable fixture. Blade wear of diamond blades generally in the range of 18 to 36 inches are addressed and the problems associated with measuring blade wear of these blades are identified. The transducer is provided with suitable readout devices to determine blade wear. Although blade wear is addressed, it is for relatively large, easily visible blade sizes, and measured while the blade is held motionless. Further, the issues associated with exposure and depth of cut into a substrate is not addressed. Flange clearance is not a major concern for the 18 to 36 inch blade.

There is a need to monitor blade exposure, the amount of blade extending from the flanges holding the blade therebetween, during a wafer or substrate dicing for maintaining sufficient clearance between the flange edges and the substrate to provide adequate cooling, and further for preventing the flanges from contacting the substrate, often containing electronic chips valued in the many thousands of dollars.

SUMMARY OF THE INVENTION

A method for dicing a semiconductor wafer useful in providing a safe clearance between a dicing blade flange periphery and the wafer is provided which includes the steps of mounting a dicing blade within a flange onto a dicing saw spindle for rotation of the blade about the spindle axis, the dicing blade having a diameter defining a cutting edge, the blade diameter greater than each flange diameter for providing a blade portion extending radially outward from the flanges, thus exposing the blade portion for cutting into a wafer. A semiconductor wafer having a known thickness is placed onto a work surface for holding the wafer onto the surface during wafer dicing. The saw is then operated for dicing the wafer by making a multiplicity of cuts through the wafer. The blade diameter is reduced with each cut thus reducing the blade exposure and reducing a clearance between each flange and wafer top surface for each cut requiring the same depth of cut. The flange clearance is calculated by measuring blade wear after a preselected number of cuts through the wafer for automatically monitoring the flange clearance during the dicing step.

In a preferred embodiment, blade movement toward the work surface is stopped when the blade exposure and thus the flange clearance is reduced to less than a preselected minimum. Further, a separation distance between the work surface and the blade cutting edge is calculated and the blade movement toward the work surface is stopped when the blade cutting edge falls outside a preselected distance. The blade edge is sensed during rotation of the blade prior to the wafer cutting step for setting a reference position for the blade edge and spindle axis, and after the preselected number of cuts for determining an axis position difference for the worn blade. The exposure calculating step is made using the axis position difference and the flange diameter.

To achieve such a dicing method, a system is provided which includes a dicing blade held within a flange for rotation about a spindle axis of the dicing saw, the dicing blade having a greater diameter than the flange for exposing a blade cutting edge, the spindle axis movement controllable relative to the work surface for dicing a wafer held thereto, means for sensing the blade cutting edge during rotation of the blade about the spindle axis, the sensing means providing a signal output responsive to the sensed edge, the sensing means being at a fixed position relative to the dicing saw work surface, and processing means operatively coupled to the sensing means for deriving signal data input therefrom, the processing means having means for storing the data provided by the sensing means, the processing means further having means for controlling blade spindle axis positions and providing blade edge measurements and thus blade wear from the spindle axis positions upon receipt of the sensing means signal data, the processing means calculating a blade exposure from an input flange diameter and providing a signal representative thereof, the processing means stopping spindle movement toward the work surface when a preselected exposure is calculated. In the preferred embodiment of the present invention, the sensing means comprises a height sensor having a sensing surface at the fixed position, the sensing surface responsive to contact of the surface by the rotating blade cutting edge. Further, a disk is attached to the sensing surface. The disk is hard enough to resist cutting by the rotating blade edge while permitting the responsive contact between the blade edge and sensor surface.

It is a primary object of the present invention to provide a method for safely dicing a semiconductor wafer while preventing the blade flange from running into the wafer. It is further an object of the invention to monitor flange clearance for providing effective blade coolant flow at minimum blade clearances. It is yet another object of the invention to permit a full cut through the wafer without flange interference while monitoring blade wear. It is further an object to control the wafer dicing knowing that blade wear takes place and thus flange clearance continuously decreases while achieving optimum blade use. It is yet another object of the invention to provide automation to the traditionally manual and semiautomatic monitoring of the wafer dicing process.

BRIEF DESCRIPTION OF DRAWINGS

A preferred embodiment of the invention as well as alternate embodiments are described by way of example with reference to the accompanying drawings in which:

FIG. 3a and 3b are plan and end views, respectively, of a dicing saw blade;

DETAILED DESCRIPTION OF PREFERRED EMBODIMENT

Figure 1:
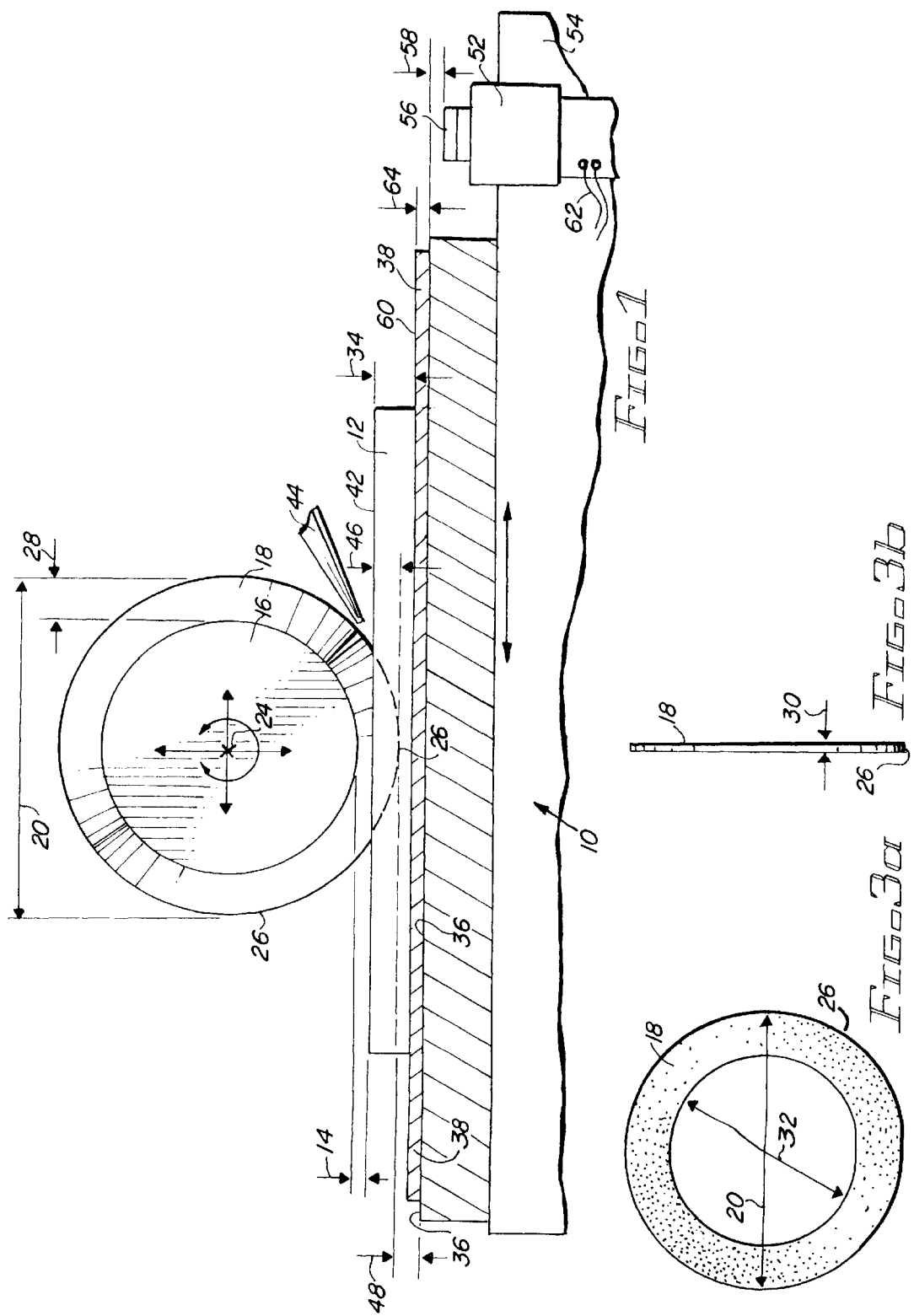
FIG. 1 is a partial diagrammatic elevational side view of a dicing saw embodiment of the present invention.
Figure 2:
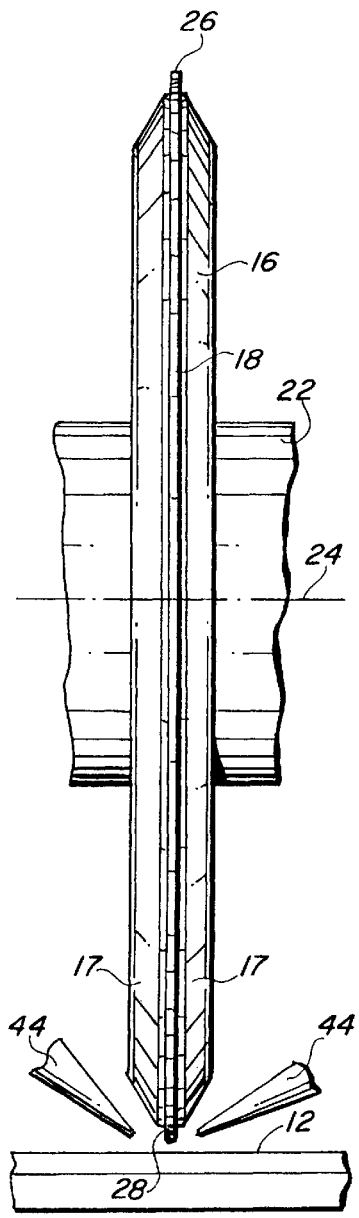
FIG. 2 is a partial end view of a dicing blade held onto a spindle within flanges.

The preferred embodiment of the present invention is described with reference to the drawings, wherein a method and dicing saw system 10 for automatically dicing a semiconductor wafer 12 provides a flange clearance 14 between a dicing blade flange 16 and the wafer 12 for a safe operation, as illustrated with reference to FIG. 1. By way of example, a resinbonded dicing blade 18 will wear resulting in a reducing outer diameter 20 as it is used to cut given wafer materials. The blade 18 is mounted on a spindle 22, as illustrated with reference to FIG. 2, for rotation about a spindle axis 24. The flange 16 is typically a flange pair 17 holding the blade 18 between the flange pair 17. The dicing blade 18 has its outer diameter 20 defining a cutting edge 26. The blade outer diameter 20 is greater than the diameter of each flange 16 thus providing a blade portion 28 extending radially outward from the flange pair 17 for providing this portion 28 as the blade exposure.

Depending on the hardness, density and abrasiveness of the blade material, as well as the cutting rates, spindle rotation speeds, and ability to cool the blade 18 while it is cutting, varying amounts of blade wear will be realized thus reducing the blade exposure 28. The blade wear is further complicated by the type or make-up of the diamond blade 18 itself. Fine abrasive blades are more difficult to cool than blades having larger abrasives. A typical dicing blade 18 is further illustrated with reference to FIGS. 3a and 3b identifying a blade thickness 30 and blade inner diameter 32 as well as the outer diameter 20 defining the blade cutting edge 26.

Dicing blades 18 are fragile by nature. They may be metal or resin in makeup, and are typically in thicknesses 30 ranging from as thin as 0.00012" to 0.500". Outer diameters 20 vary from as little as 1" to 6". Due to the fragile nature of the dicing blade 18, they require stiff flanges 16 for mounting them onto the rotating spindle 22. Flanges 16 are typically made from metals such as aluminum, stainless steel or titanium. Flanges 16 for holding the dicing blade 18 come in an infinite range of diameters, each smaller to some degree than the dicing blade 18 as discussed. The difference between the flange radius and blade radius is the blade exposure 28. It is this blade exposure 28 that gives the thin dicing blade 18 its stiffness sufficient for cutting into the wafer 12.

Again with reference to FIG. 1, the wafer 12 having a wafer thickness 34 is held onto a work surface 36 of the dicing saw. Typical work surfaces 36 hold workpieces thereto using a vacuum. In many arrangements, and as illustrated with reference to FIG. 1, a carrier 38 is placed on the work surface 36 for receiving the wafer 12. Such an arrangement permits the blade 18 to cut completely through the wafer 12 without cutting into the work surface 36.

Figure 4:
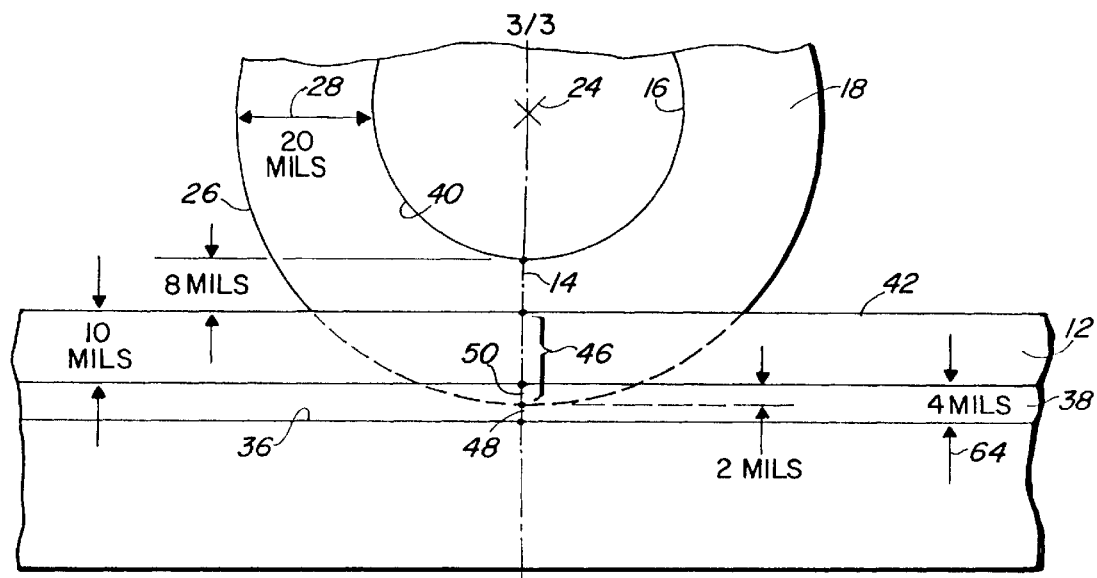
FIG. 4 is a partial diagrammatic elevation view of a wafer cutting arrangement.

By way of further example, and with reference to FIG. 4, typically the blade exposure 28 is about ten times the blade thickness 30. For example, a 0.002" thick blade would be exposed 0.020" as a rule of thumb. Actual application know-how will vary this flexible rule. In addition, a minimum clearance between a flange edge 40 and a wafer top surface 42, the flange clearance 14, must be sufficient for permitting coolant from a coolant nozzle 44, as illustrated with reference to FIG. 1, to provide adequate cooling to the dicing process, and further must be maintained for avoiding contact between the flange edge 40 and wafer top surface 42 resulting in damage to a typically expensive wafer 12. Again with reference to FIG. 4, and continuing with a dimensional example, cutting the wafer 12 having a thickness of 0.010" and wanting to cut through the wafer 12 and beyond by 0.002", a depth of cut 46 would be 0.012". This would result in a flange clearance 14 of 0.008". As the blade 18 wears, reducing its outer diameter 20, and the dicing saw is programmed to automatically maintain the depth of cut 46, or an operator manually lowers the blade 18, the flange clearance 14 is reduced. If such lowering continues, the flange 16 will collide with the wafer 12 resulting in damage to the wafer 12, and the blade 18, and possibly cause injury to the operator. As a result, tracking the flange clearance 14 is important for providing operator and product safety, and as earlier described is one object of the present invention.

If one considers the flange clearance 14 being as little as 0.008", and the fact that the operator cannot distinguish between clearances 14 of 0.008" and 0.000", it is apparent that the need exists to track such minute clearances automatically. Typically, a 5 mil flange clearance 14 is desired. An operator would have to see 3 mils of wear. When one adds coolant and blade shields (not shown) to protect the operator, the difficulty of seeing and monitoring the flange clearance 14 is further realized. Manually tracking blade wear and calculating any resulting reduction in flange clearance 14 becomes an impractical and inadequate method resulting in an untrustworthy operation for the dicing of expensive semiconductor wafers 12.

Again with reference to FIG. 4, it is clear that in addition to monitoring flange clearance 14 and depth of cut 46, a separation distance 48 between the blade cutting edge 26 and work surface 36 can be determined. Further, a depth of cut 50 into the carrier can also be monitored.

Figure 5:
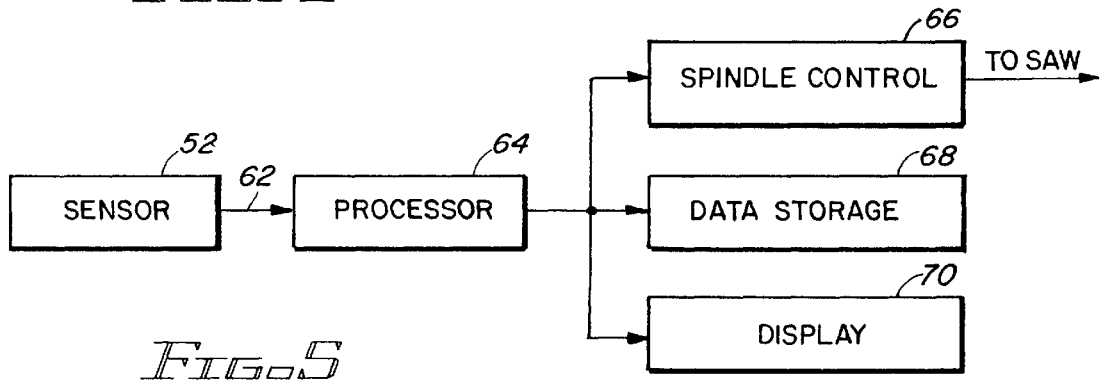
FIG. 5 is a functional block diagram of the system control used in the preferred embodiment of the present invention.

Again with reference to FIG. 1, in the preferred embodiment of the present invention, a height sensor 52 is rigidly affixed to a dicing saw portion 54 moveably engaged with the work surface 36. In this way, a sensing surface 56 of the height sensor 52 provides an accurate reference position 58. With such a reference position 58 for the sensing surface 56, the height positions of the work surface 36, the blade cutting edge 26, the wafer top surface 42, and a carrier top surface 60 are measurable. The position of the spindle axis 24 is controllable for movement of the axis 24 for causing the cutting edge 26 of the blade 18 to make contact with the sensing surface 56 wherein the height sensor 52 provides a signal representative of the blade edge position relative to an initial position established prior to the cutting process. In one embodiment of the dicing saw system 10, the work surface 36 and sensor 52 move to position the sensor 52 and wafer 12 for the operation of the dicing saw. As schematically illustrated with reference to FIG. 5, a sensor output 62 provides on electrical signal to a processor 64 for calculating blade wear, the blade exposure 28, and thus the flange clearance 14. The processor 64 includes input data representative of the wafer thickness 34, carrier thickness 64 and surface locations as earlier described. The processor 64 calculates the flange clearance 14 by measuring the blade wear after a preselected number of cuts into the wafer 12 for automatically monitoring the blade exposure 28 and thus the flange clearance 14 for the dicing of the wafer 12. In typical operation, the dicing blade 18 makes multiple cuts through the wafer 12 for separating the wafer into individual chips or die (not shown). By repeating the blade edge 26 sensing through the movement of the spindle axis 24 toward the sensing surface 56 for contacting the sensing surface 56 with the blade cutting edge 26, the flange clearance 14 which varies as the blade 18 wears is monitored during the wafer 12 dicing. The flange clearance 14 is calculated by the processor 64 using updated blade exposure 28, position of blade edge 26 above the work surface 36, the wafer thickness 34 and a diameter for the flange 16 selected. The processor 64 is programmable and operable with a spindle control 66, data storage 68, and a display 70 for controlling spindle movement and for storing and displaying the input and monitored data.

With the cloned data, a blade history is automatically tracked and blade wear information is provided to the operator using the display 70. A total wear of the blade 18 is also monitored and displayed. Such history is then used for determining the control of the spindle axis 24 for making height sensing movements. Efficiency in dicing saw operation is increased by making height sensing movements only when necessary based on the blade history for the blade 18 having known composition. Empirical data rather than operator judgment is then relied upon for setting the control parameters for the dicing saw.

Figure 6:
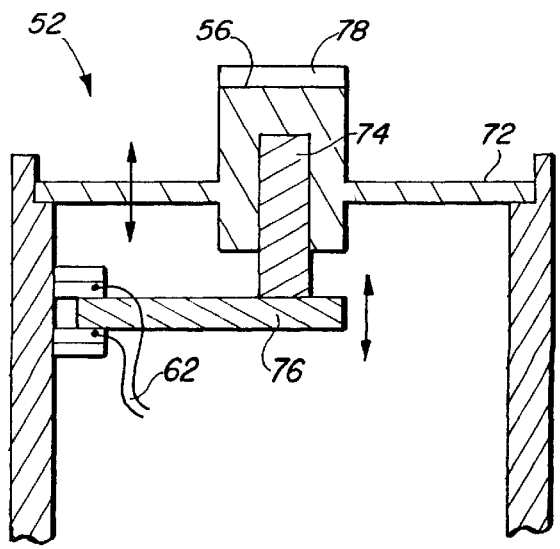
FIG. 6 is a partial cross-sectional view of a height sensor.

The height sensor 52 used in the preferred embodiment comprises a sensor provided by European Semiconductor Equipment Center (ESEC), employing a flexible membrane 72 moveable when the sensing surface 56 is contacted. As illustrated with reference to FIG. 6,a ceramic member 74 is attached between the flexible membrane 72 and a piezoelectric crystal 76. As known, movement of the crystal causes the electrical signal at the sensor output 62. The blade 18 makes contact with the sensing surface 56 while rotating and thus causes wear or cutting to the sensing surface 56. Such cutting or grinding causes excessive vibration and damage to the piezoelectric crystal 76. Replacement of the height sensor 52 or components such as the flexible membrane 72 are impractical and often times expensive. An improvement to the height sensor is made by attaching a disk 78 to the sensing surface. The disk 78 is replaceable and protects the height sensor sensing surface 56. It is preferably made of a hard material for resisting cutting by the dicing saw blade 18, or if damaged, can be easily and inexpensively replaced. In the preferred embodiment of the present invention, the disk 78 is magnetically attached to the sensing surface 56. Alternate adhesion methods, such as gluing, are acceptable. In a preferred embodiment, the disk 78 is made from carbon steel. The carbon steel disk is first nickel-coated for preventing the steel from rusting due to exposure to the coolant, and is provided with a second coating of diamonds and chrome for providing hardness and resisting damage by the rotating blade 18. In an alternate embodiment, the disk 78 comprises a magnetic ceramic material.

Figure 7:
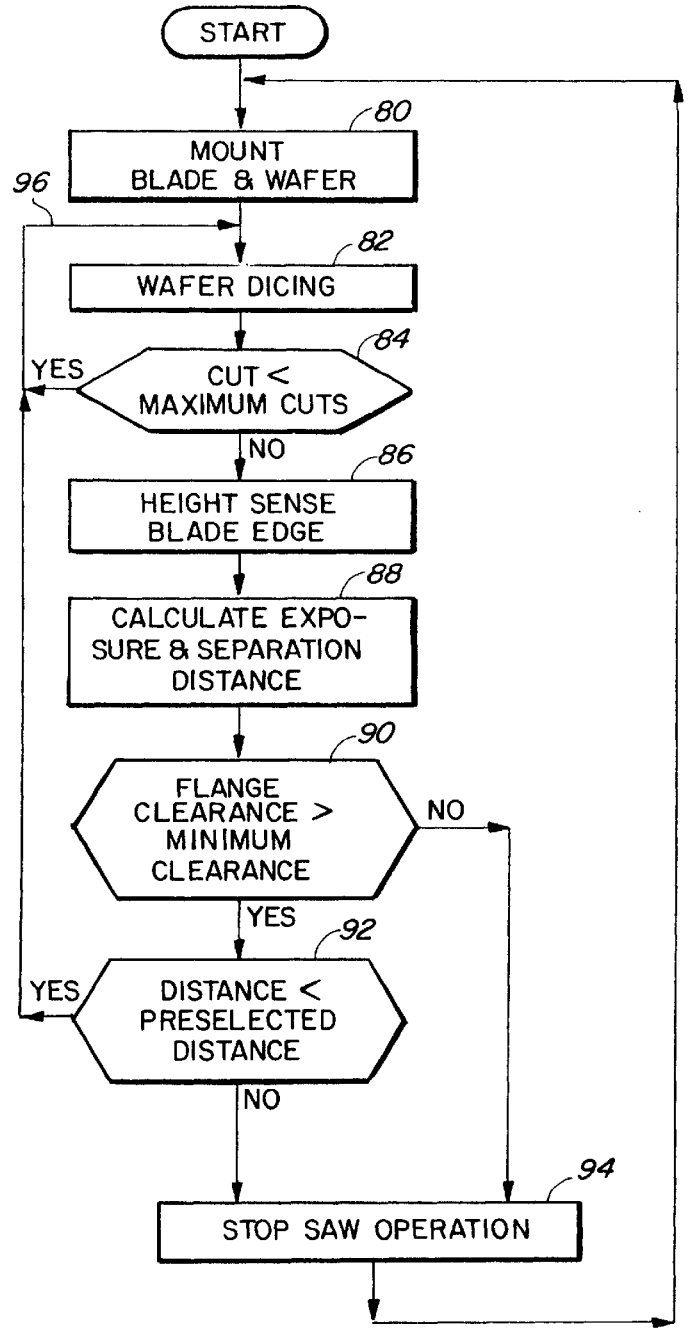
FIG. 7 is a flow diagram illustrating a logic of the dicing saw system of the present invention.

In operation, therefore, the blade 18 is mounted on the spindle 22 between the flange pair 17 for providing the blade exposure 28. The wafer 12 to be cut is mounted on the work surface 36 as earlier described, and as illustrated in the logic flow diagram of FIG. 7 as numeral 80. The blade 18 is rotated about the spindle axis 24 as is typical for dicing saws, and the wafer 12 is cut or diced into selected chips (not shown). Again with reference to FIG. 7, the wafer dicing 82 continues for a preselected number of cuts. When the cuts reach the selected, or exceed the maximum, specified 84, the blade edge 26 is delivered to the sensing surface 56 for making a height measurement 86. Blade exposure is calculated for determining flange clearance and a separation distance is also calculated 88 as earlier described. The calculated flange clearance is compared to a minimum allowable clearance 90, and the separation distance 48, again with reference to FIG. 1, is compared 92 to a preselected distance. If the flange clearance 14 or the separation distance 48 do not meet that required, saw operation is stopped 94 until corrective action is taken. If the saw is operating within the standards set for flange clearance and separation, wafer dicing continues 96.

Some important guidelines that should be considered in the selection of equipment intended for dicing hard, brittle materials include:

Feed Rate (table movement). The range of feed rates available is important, and should be compatible with the intended applications. Beware of machines that cannot achieve the low range of feed rates, and those that produce uneven table movement when set to low feed rates.

Spindle Speed (rpm) should be variable—preferably from about 5,000 to 40,000 rpm for a nominal two through five inch diameter blade. The method of accomplishing spindle speed changes is important, and the machine should provide operator indication of the selected spindle speed.

Blade Utilization. The machine should be capable of accepting hub-type or free-standing diamond blades in conjunction with adjustable coolant nozzles 44 and microscope alignment to accommodate any design differences. A machine that limits the user to a single type or source of diamond blade 12 should not even be considered.

Depth of Cut. When considering equipment, the maximum attainable depth of cut 46 should be ascertained, so that optimum blade utilization can be realized. This is a particularly important consideration for cutting thick substrates or wafers 12 as described herein.

We would all like to think that any cutting task could be successfully achieved by simply acquiring any machine and blade 18 combination, producing parts with virtually no loss of the wafer 12 or material being processed, and experiencing no edge damage to the finished parts or diced wafer. However, reality dictates that much careful planning and control over numerous variables is necessary in order to create such an efficient sawing system. Material type, depth of cut, desired throughput, feed rates, spindle speed, cooling nozzle design, mounting, kerf, blade exposure, diamond particle size, available power, and blade flange design, are but a partial list of the variable components affecting the sawing process. There are three critical laws or constraints for dicing and diamond grinding technology that should be followed. Applying these laws properly is critical in the proper selection of process components.

The parameters of rigidity, power, and cooling must be considered for each system component selection. It must also be understood that each component involved in the dicing or cutting process cannot create sawing efficiency alone, but rather all of the components as an interactive system must be compatible in meeting standards. If just one component is in error, it could render all other properly selected components ineffective due to its dominance in the sawing process.

Rigidity

Whether dicing thin silicon materials at inch-per-second feed rates, or cutting into heavy cross-sections of ceramic-based materially, system rigidity plays a major role in sawing efficiency. It is most important to note that rigidity not only pertains to the equipment being used, but also to the diamond blade 18 and workpiece or wafer 12 mounting methods, as well as to operating parameters.

A rigidly mounted spindle 22 with virtually no end play or vibration is mandatory for dicing and diamond grinding. Additionally, the perpendicularity of the spindle axis 24 to the spindle direction of movement toward the work surface 36 is essential for the diamond blade 18 to run true. Presently, air-bearing spindles are the most commonly used because of their exceptionally smooth operation and extended working life.

While most end users will take considerable steps in assuring the rigidity of the machine they purchase, they will most often overlook the critical mounting requirements necessary for the diamond blade. No matter how well the diamond blade 18 was manufactured to run true, it can only run as accurately as the surfaces with which it comes into contact. The bearing surfaces of the flanges 16 or spacers (not shown) must be flat, clean, and parallel.

Spacers used in gang cutting operations are generally made from aluminum or titanium carbide, depending on the application. As described, the flanges 16 for single blade mounting are usually made from stainless steel. The flanges 16 will incorporate an undercut to reduce the bearing surface area in order to enhance intimate contact with the diamond blade. These surfaces, as well as the diamond blade surfaces, must be clean, with no loose particles present prior to assembly. This insures proper fitting of the mating surfaces. All flanges and spacers must be supplied with torque specifications to aid the user in preventing distortion and separation of the bearing surfaces from the diamond blade. The most frequent cause of blade breakage and oversize cut widths, with relation to blade thickness 30, is an improper flange torque or poor flange quality. Flanges 16 and spacers must be of high integrity in order not to induce vibration at operating spindle speeds.

The blade exposure 28 is a critical component within the variables affecting the overall rigidity of the sawing system. Over-exposure may cause wider than desired kerf, excessive edge chipping, non-squareness of cut, and blade breakage, while too little blade exposure can divert the critical coolant supply from the blade/material interface.

The best results will be attained by adjusting the "ten times blade thickness" guideline in accordance with a prerequisite that at least ⅓ to ½ of the diamond blade's exposure be buried into the cut. This prerequisite is the dominant variable in establishing proper blade exposure 28. This approach offers improved stability at start, and depending upon material hardness and feed rates, can be fine-tuned with only minor adjustments. The tendency should be to expose the diamond blade 18 at a minimum to attain maximum blade rigidity, with caution given in regard to a possible coolant cut-off or a collision of the flange with the workpiece. The alternative is to run a maximum exposure within the guidelines, to reduce the amount of flange changes required in order to consume the entire working range of the self-sharpening diamond blade.

Equally important to rigid blade mounting procedures are the wafer mounting techniques. These two variables of the sawing system are the closest in proximity to the desired finished parts, and warrant proper attention. As earlier described, the wafer 12 is normally mounted on an intermediate carrier 38, which is then mounted onto the work surface by vacuum or mechanical means. This enables the user to cut completely through the wafer without causing damage to the work surface 36. Vacuum work surface chuck systems require a vacuum gauge to indicate holding stability and assure operating safety.

The two most common intermediate carriers 38 are tape and glass. The wafer 12 is held to the "tacky" side of the tape, while wax is used as the holding medium for mounting on glass.

Effective cooling of the diamond blade at the point of contact with the material being processed is a basic essential for any diamond grinding application. The starting point for an efficient cooling system is the supply nozzle configuration 44 which directs the coolant medium. Dual nozzle 44 arrangements are superior to single nozzle design in supplying coolant to the critical areas of the diamond blade during the cutting operation. Coolant must be directed at the blade/material interface as well as the leading edge of the blade. The coolant, after leaving this initial contact point, should follow along both sides and the extreme outside edge of the blade in such a manner that it will create intimate contact with these blade surfaces.

A single nozzle will satisfy the directional requirement, but will fail to create intimate contact with the blade along its sides. The single stream of coolant, directed at the cutting interface, is split by the diamond blade into two separate streams and deflected away from the sides of the blade. The resulting decrease in cooling efficiency is noted by higher edge chipping damage when processing brittle materials, lower blade life, and erosion on the sides of the diamond blade, which will cause uneven cuts.

Dual Nozzles provide two separate streams of coolant to the cutting interface, and at an angle to the cutting edge of the blade, so that each stream will favor one side of the diamond blade after providing the necessary coolant to the leading edge. This complement provides the necessary coolant to all of the critical areas of the cutting blade, with no loss of direction required for removing the debris generated during cutting.

Coolant nozzles 44 must provide a full and airless flow of coolant. Additionally, the nozzles should be installed in close proximity to the blade in order to prevent excessive pressure drop of the supply, and to insure that no air will become entrapped in the coolant stream prior to contact with the blade/material interface.

Recirculating coolant systems require efficient filtering to remove the particles generated during cutting.

Coolant temperatures have a pronounced effect on blade life and cut quality in diamond grinding technology. Test results indicate that coolant temperatures above 80 degrees Fahrenheit should be avoided, while temperatures of 50 degrees or less dramatically improve cutting performance. Refrigeration of the coolant medium is easily adapted to most recirculating systems, and is highly recommended.

While a specific embodiments of the invention have been described in detail herein above, it is to be understood that various modifications may be made from the specific details described herein without departing from the spirit and scope of the invention as set forth in the appended claims. Having now described the invention, the construction, the operation and use of preferred embodiments thereof, and the advantageous new and useful results obtained thereby, the new and useful constructions, methods of use and reasonable mechanical equivalents thereof obvious to those skilled in the art, are set forth in the appended claims.

What is claimed is:

1. A system in a dicing saw for monitoring dicing blade exposure, comprising:

a dicing blade held within a flange for rotation about a spindle axis of the dicing saw, the dicing blade having a greater diameter than the flange for exposing a blade cutting edge, the spindle axis movement controllable relative to the work surface for dicing a wafer having a top surface and an opposing bottom surface held to the work surface;

means for sensing the blade cutting edge during rotation of the blade about the spindle axis, the sensing means providing a signal output responsive to the sensed edge, the sensing means being at a fixed position relative to the dicing saw work surface; and processing means operatively coupled to the sensing means for deriving signal data input therefrom, the processing means having means for storing the data provided by the sensing means, the processing means further having means for controlling blade spindle axis positions and providing blade edge measurements and thus blade wear from the spindle axis positions upon receipt of the sensing means signal data, the processing means calculating a blade exposure from an input flange diameter and providing a signal representative thereof, the processing means stopping spindle movement toward the work surface and thus into the wafer when a preselected clearance between the flange and wafer top surface is calculated.

2. The system as recited in claim 1, wherein the sensing means comprises a height sensor having a sensing surface at the fixed position, the sensing surface responsive to contact of the surface by the rotating blade cutting edge.

3. The system as recited in claim 2, further comprising a disk attached to the sensing surface, the disk sufficiently hard for resisting cutting by the rotating blade edge while permitting the responsive contact between the blade edge and sensor surface.

4. The system as recited in claim 3, wherein the disk is magnetically held to the sensing surface.

5. The system as recited in claim 3, wherein the disk comprises:

a metal core; and a second coating having diamond particles sufficient for providing a surface hardness resistive to cutting by a diamond impregnated dicing blade.

6. The system as recited in claim 1, further comprising means for monitoring a number of cuts through a wafer during wafer dicing and providing a blade wear history from the blade edge sensing data and number of cuts for the blade.

7. The system as recited in claim 1, wherein the processing means further comprises means for controlling the sensing means, the controlling means permitting continuous and incremental sensing signal outputs.

8. A dicing saw system for a semiconductor wafer dicing saw useful in preventing a flange holding a dicing blade from damaging the semiconductor wafer, the system comprising:

a displacement transducer having a sensing surface responsive to contact from a rotating dicing blade, the transducer providing a signal output in response to displacement of a sensing surface by contact from the rotating blade;

means for affixing the transducer proximate a dicing saw work surface, wherein the transducer sensing surface is at a fixed position relative to the work surface, the transducer sensing surface further positioned for receiving a cutting edge of the rotating blade in response to a control signal from a processing means operable with the dicing saw;

processing means operatively coupled to the transducer for deriving a signal input therefrom, the processing means having means for storing data provided by the transducer, the processing means further having means for detecting blade spindle axis positions and providing blade wear from the spindle axis position upon receipt of the transducer signal output indicative of a blade diameter, the processing means calculating a blade exposure and providing an output signal representative thereof; and means for controlling spindle movement toward the work surface, the spindle controlling means responsive to blade exposure output signals for stopping the spindle movement upon receipt of a preselected signal indicative of an unacceptable minimum exposure, the spindle controlling means further controlling spindle movement and thus blade edge movement to the transducer for contacting the sensing surface.

9. The system as recited in claim 8, further comprising a disk attached to the sensing surface, the disk sufficiently hard for resisting cutting the rotating blade edge while permitting the responsive contact between the blade edge and sensor surface.

10. The system as recited in claim 8, further comprising means for monitoring a number of cuts through a wafer and providing a blade wear history from the blade edge sensing data and number of cuts for the blade.

11. The system as recited in claim 8, wherein the processing means further comprises means for controlling the sensing means, the controlling means permitting continuous and incremental sensing signal outputs.

* * * * *